Patented Sept. 14, 1954

2,689,186

UNITED STATES PATENT OFFICE 2,689,186

CERAMIC DIELECTRIC MATERIALS

Jean Day, Paris, France, assignor to Compagnie Generale de Telegraphie Sans Fil, a corporation of France No Drawing. Application June 14, 1952,
Serial No. 293,675

Claims priority, application France June 21, 1951

7 Claims. (Cl. 106—39)

The present invention relates to ceramic materials having a high dielectric constant.

Ceramics of high dielectric constant enable condensers to be produced which have a high capacity while occupying but little space. In order to obtain condensers of good quality, more particularly for radio-electric purposes, the ceramics utilised ought to have various properties: a low angle of dielectric losses at high frequency, a very high insulation resistance, a high specific inductive capacity, and a practically zero temperature coefficient of the specific inductive capacity. Now amongst known ceramics the last two of these properties are irreconcilable: those of high specific inductive capacity have a large temperature coefficient, and those with zero temperature coefficient have a specific inductive capacity of the order of 50 at most. It is obviously a question here of ceramics exhibiting the other qualities required of good dielectrics, namely low dielectric losses and very high insulation resistance. Furthermore the ceramics in question must be fluidtight, that is, without marked porosity, and they must be mechanically strong, in order not to compromise the robustness of the condensers.

The object of the present invention is to provide a ceramic product exhibiting an angle of losses equal at most to $2.5 \times 10^{-4}$ at 1 megacycle, a specific inductive capacity of about 130, a temperature coefficient which is very low, or even zero, while still exhibiting the other electrical and mechanical qualities mentioned above.

According to the invention the fluidtight ceramic dielectric product is composed of:

|  | Percent |
|---|---|
| Calcium titanate, $CaTiO_3$ | 40 to 85 |
| Barium titanate, $BaTiO_3$ | 50 to 14 |
| Barium ceriate, $BaCeO_3$ | 10 to 1 |

Less than 5% of impurities may be permitted, consisting of compounds of rare earths originating from impurities in the cerium; or else added by way of fluxes according to current practice: Zinc titanate or cadmium titanate, silicious compounds, or lead borate. It is to be noted that alkali metal oxides are rigorously excluded, for they occasion a substantial increase in the angle of dielectric losses of the material.

In the product there are two sorts of crystals, the sizes of the crystalline meshes of which are different. Those of one sort have substantially the mesh of pure calcium titanate, and the others have a mesh slightly larger than that of pure barium metatitanate, and apparently consist of a solid solution of barium metaceriate in barium titanate.

The standard composition comprises, by weight:

67% of calcium titanate $CaTiO_3$
30% of barium titanate, $BaTiO_3$
3% of barium ceriate, $BaCeO_3$ A composition derived from the foregoing comprises:

62% of $CaTiO_3$
30% of $BaTiO_3$
6% of $BaCeO_3$
2% of steatite added as a flux This composition exhibits a specific inductive capacity of about 130, and a temperature coefficient of $-200 \times 10^{-6}$ up to 55° C., and of $+200 \times 10^{-6}$ up to 70° C.

The product is obtained by crushing the constituents to powder in a porcelain ball grinder, sifting these powders, mixing them in the desired proportions, homogenising the mixture in the presence of water, drying, grinding again, followed by sifting, adding an organic binder, shaping by moulding or spinning, and baking the articles thus obtained at about 1300° C. in an oxidising atmosphere. In this way a fluidtight material is obtained, which exhibits good mechanical qualities.

I claim:

1. A fluid tight ceramic dielectric material having a low temperature coefficient, a specific inductive capacity of about 130 and a maximum loss angle at 1 megacycle of $2.5 \times 10^{-4}$, said ceramic essentially consisting of the following proportions by weight:

Calcium titanate, $CaTiO_3$, 48 to 85 per cent
Barium titanate, $BaTiO_3$, 50 to 14 per cent
Barium ceriate, $BaCeO_3$, 10 to 1 per cent and up to 5% of a flux.

2. A fluid tight ceramic dielectric material having a low temperature coefficient, a specific inductive capacity of about 130 and a maximum loss angle at 1 megacycle of $2.5 \times 10^{-4}$, said ceramic essentially consisting of the following proportions by weight:

Calcium titanate, $CaTiO_3$, 40 to 85 per cent
Barium titanate, $BaTiO_3$, 50 to 14 per cent
Barium ceriate, $BaCeO_3$, 10 to 1 per cent and up to 5% of zinc titanate as a flux.

3. A fluid tight ceramic dielectric material having a low temperature coefficient, a specific inductive capacity of about 130 and a maximum loss angle at 1 megacycle of $2.5 \times 10^{-4}$, said ceramic essentially consisting of the following proportions by weight:

Calcium titanate, CaTiO$_3$, 40 to 85 per cent
Barium titanate, BaTiO$_3$, 50 to 14 per cent
Barium ceriate, BaCeO$_3$, 10 to 1 per cent and up to 5% of cadmium titanate as a flux.

4. A fluid tight ceramic dielectric material having a low temperature coefficient, a specific inductive capacity of about 130 and a maximum loss angle at 1 megacycle of $2.5 \times 10^{-4}$, said ceramic essentially consisting of the following proportions by weight:

Calcium titanate, CaTiO$_3$, 40 to 85 per cent
Barium titanate, BaTiO$_3$, 50 to 14 per cent
Barium ceriate, BaCeO$_3$, 10 to 1 per cent and up to 5% of lead borate as a flux.

5. A fluid tight ceramic dielectric material having a low temperature coefficient, a specific inductive capacity of about 130 and a maximum loss angle at 1 megacycle of $2.5 \times 10^{-4}$, said ceramic essentially consisting of the following proportions by weight:

Calcium titanate, CaTiO$_3$, 40 to 85 per cent
Barium titanate, BaTiO$_3$, 50 to 14 per cent
Barium ceriate, BaCeO$_3$, 10 to 1 per cent and up to 5% of steatite as a flux.

6. A fluid tight ceramic dielectric material having a low temperature coefficient, a specific inductive capacity of about 130 and a maximum loss angle at 1 megacycle of $2.5 \times 10^{-4}$, said ceramic consisting of 67% by weight calcium titanate, 30% by weight barium titanate and 3% by weight barium ceriate.

7. A fluid tight ceramic dielectric material having a low temperature coefficient, a specific inductive capacity of about 130 and a maximum loss angle at 1 megacycle of $2.5 \times 10^{-4}$, said ceramic consisting of 62% by weight calcium titanate, 30% by weight barium titanium, 6% by weight barium ceriate and 2% by weight steatite.

References Cited in the file of this patent

UNITED STATES PATENTS

| Number | Name | Date |
|--------|------|------|
| 2,520,376 | Roup et al. | Aug. 29, 1950 |